Nov. 7, 1933.  R. M. WOYTYCH  1,933,575
MILLING HEAD ATTACHMENT
Filed April 12, 1930   2 Sheets-Sheet 1

Inventor:
Raymond M. Woytych,
By Chindahl, Parker & Carlson
Attys.

Nov. 7, 1933.    R. M. WOYTYCH    1,933,575
MILLING HEAD ATTACHMENT
Filed April 12, 1930    2 Sheets-Sheet 2
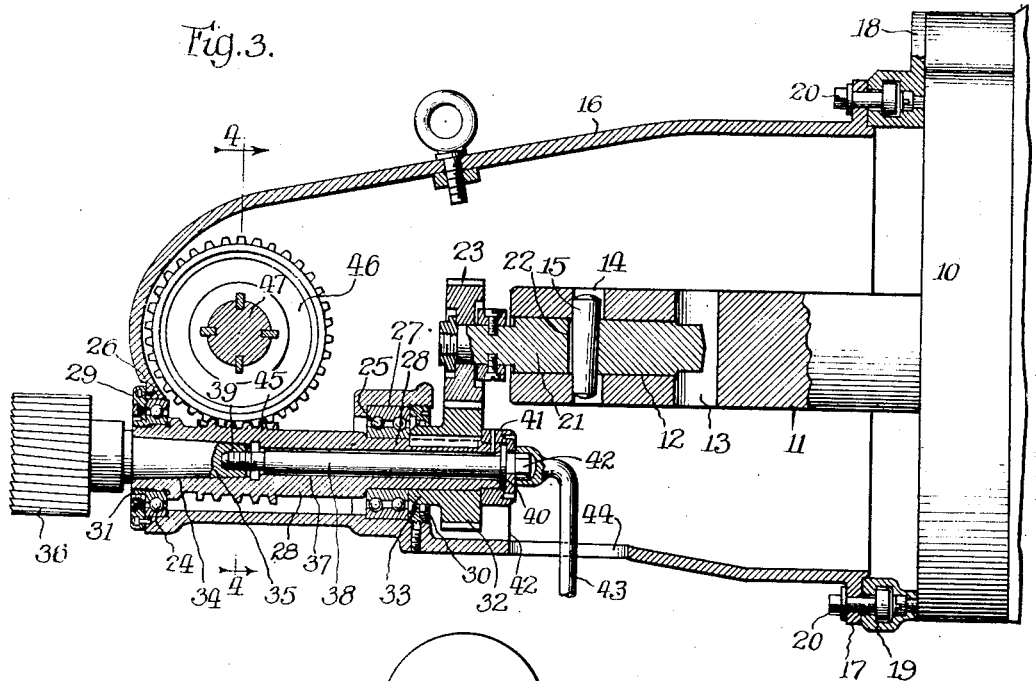
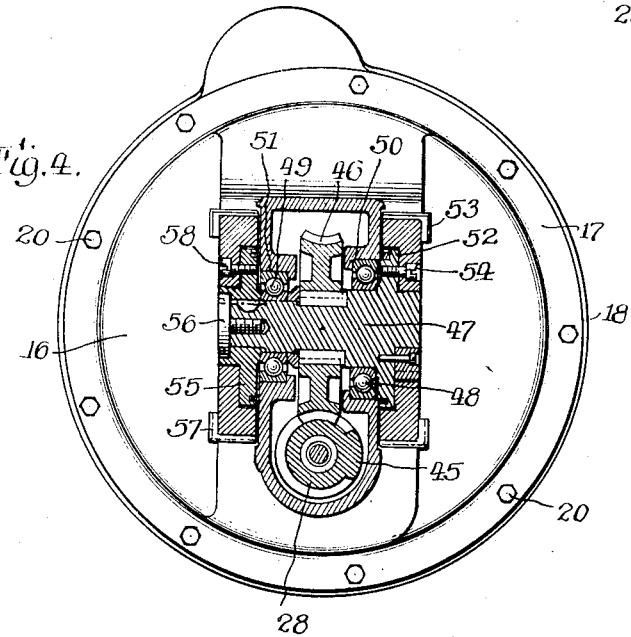
Inventor:
Raymond M. Woytych,
By Chindahl, Parker & Carlson
Attys.

Patented Nov. 7, 1933

1,933,575

UNITED STATES PATENT OFFICE 1,933,575

MILLING HEAD ATTACHMENT

Raymond M. Woytych, Fond du Lac, Wis., assignor to Giddings & Lewis Machine Tool Co., Fond du Lac, Wis., a corporation of Wisconsin Application April 12, 1930. Serial No. 443,673

13 Claims. (Cl. 90—17)

The present invention relates to improvements in milling head attachments for machine tools, and has as its primary object the provision of a novel combination side and end milling head attachment for milling surfaces at right angles to each other at one setting of the work.

Other objects reside in the provision of a new and improved attachment of the foregoing character which renders it practicable to mill surfaces, particularly on special work pieces, such for example as bolster plates, and guideways, and bearing cap seats of press frames, etc., that formerly in common practice were planed, which effects a substantial saving in time over a planing operation for performing the same work, and which causes the milled perpendicular surfaces to be square relatively to each other.

A further object is to provide a mounting for the attachment permitting rotary adjustment of the cutter into any desired angular position.

A general object resides in the provision of a novel milling head attachment having side and end cutters which is simple, compact, sturdy and inexpensive in construction, and which can be easily and quickly installed or removed.

Further objects and advantages will become apparent as the description proceeds.

In the accompanying drawings, Figure 1 is a side elevational view of a milling head attachment embodying the features of my invention.

Fig. 3 is a longitudinal sectional view taken along line 3—3 of Fig. 2.

Fig. 4 is a transverse sectional view taken along line 4—4 of Fig. 3.

Figure 1:
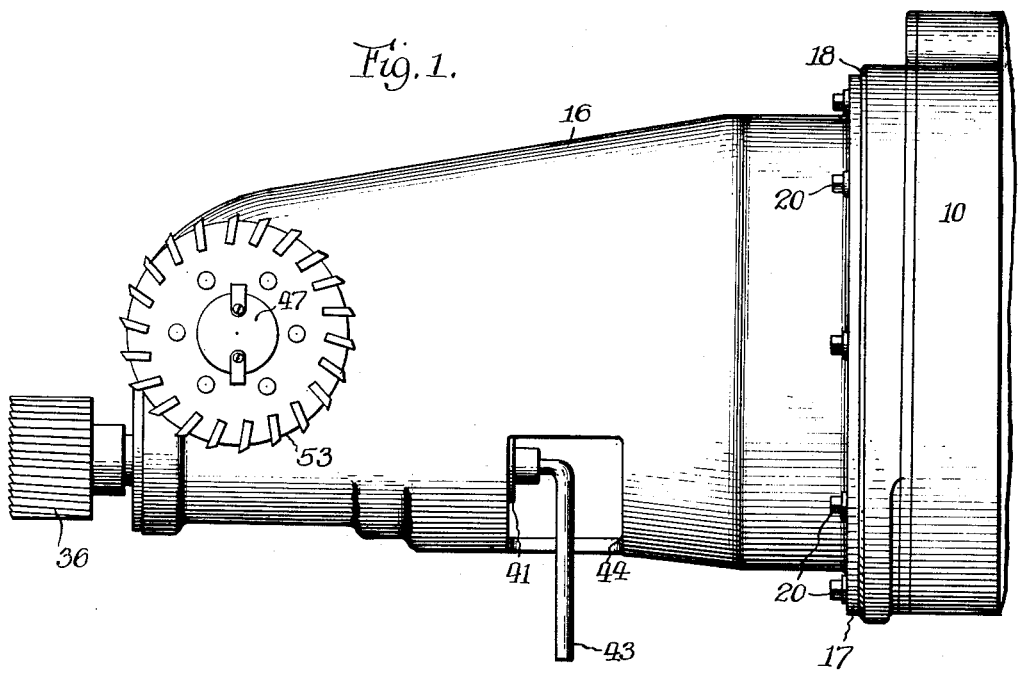
Figure 2:
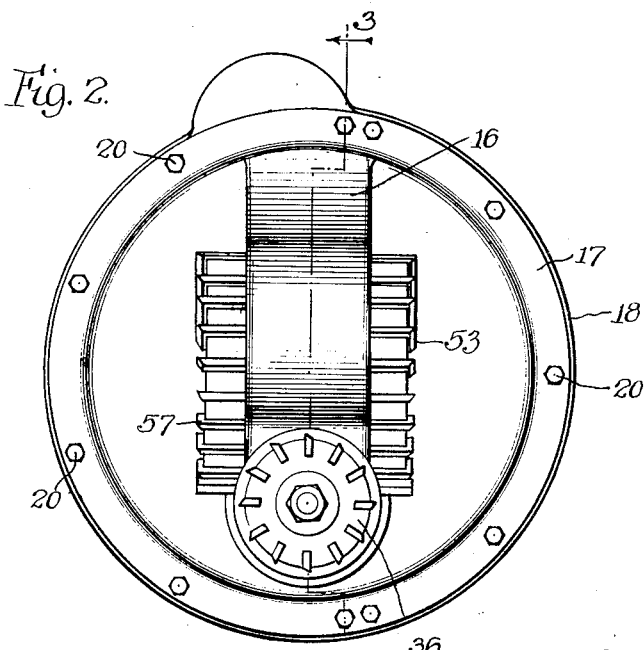
Fig. 2 is an end elevational view of the attachment.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The milling head attachment may be installed on a variety of machine tools, for example, boring, drilling and milling machines, in which the cutter head and the work are adapted to be moved relatively in mutually perpendicular directions. However, the attachment is particularly adapted for installation on horizontal milling machines, and therefore for purposes of illustration is shown in the drawings in connection with fragments of such machine.

Referring more particularly to the drawings, the milling machine comprises a headstock 10 having a main horizontal spindle 11 projecting therefrom. A cover plate (not shown) normally is secured to the headstock 10 about the spindle 11, and is adapted to be replaced by the casing of the milling attachment. The outer end of the spindle 11 is formed with a tapered socket 12 adapted to receive the shank of the tool (not shown) normally in use. A diametric hole 13 is formed in the spindle 11 at the inner end of the socket 12 for the reception of a suitable instrument (not shown) whereby the shank may be ejected. A second diametric hole 14 is formed in the spindle 11 intermediate the ends of the socket 12 for the reception of a pin 15 to hold the shank securely in place.

The milling head attachment in the preferred form comprises a suitable housing 16 which preferably is elongated and tapered in general form, and the large end of which is formed with an outer peripheral mounting rim 17 adapted to be suitably secured to the headstock 10. In the present instance, an adapter ring 18 is secured to the headstock 10, and is formed with a circular T-slot 19, and the rim 17 is secured thereto by means of bolts 20 for adjustment into any desired angular position about the spindle 11.

A tapered arbor 21 is mounted in the socket 12, and is formed with a diametric hole 22 intermediate its end for reception of the retaining pin 15. A suitable gear 23 is secured to the free outer end of the arbor 21.

Rotatably journaled in anti-friction bearings 24 and 25 mounted in suitable bearing seats 26 and 27 in the lower part of the housing 16 is a longitudinal spindle 28. The anti-friction bearings 24 and 25 are held respectively in their bearing seats by means of suitable annular retaining members 29 and 30. An inner bearing ring 31 suitably secured to the front end of the spindle 28 is in peripheral bearing engagement with the retaining member 29, thereby closing the front end of the seat 26 against the entry of dirt and foreign matter.

Keyed to the inner end of the spindle 28 is a gear 32 meshing with the gear 23. The gear 32 is formed with a hub 33 in inner peripheral bearing engagement with the member 30 to close the rear end of the anti-friction bearing 25.

The outer end of the spindle 28 extends to the free end of the casing 16, and is formed with a suitable tapered socket 34 for receiving a tapered tool shank 35 on which an end milling tool 36 is mounted. An axial bore 37 opens from the inner end of the socket 34 through the spindle 28. Rotatably adjustable in the bore 37 is a bolt 38, the forward end of which extends into the inner end of the socket 34 for threaded engagement with an opening 39 in the inner end of the shank 35 to hold the latter in position. The rear end of the bolt 38 is formed with a peripheral collar 40 which is secured against the inner end of the spindle 28 by means of a gland 41 secured to the latter, and is formed with a head 42 adapted for engagement by a suitable instrument 43 whereby the bolt may be rotated to clamp the shank 35 in position. The lower side of the housing 16 is formed with a suitable opening 44 for reception of the instrument 43.

The spindle 28 is formed intermediate the bearings 24 and 25 with a suitable worm 45 which meshes with a worm wheel 46 keyed to a transverse spindle 47 suitably journaled in anti-friction bearings 48 and 49 in the housing 16. The sides of the housing 16 are flattened, and the ends of the spindle 47 project therefrom for the attachment of a suitable side milling cutter on one or each end. In the present instance, the sides of the housing 16 are formed respectively with outwardly facing seats 50 and 51 in which the bearings 48 and 49 are mounted. A peripheral flange 52 is formed on one end of the spindle 47, and abuts against the outer face of the inner raceway of the bearing 48. A suitable side milling cutter 53 is removably secured as by means of bolts 54 to the outer face of the flange 52.

The other end of the spindle 47 is reduced in size and a flange disk 55 is secured thereon as by means of a screw bolt 56. The disk 55 corresponds generally to the flange 52, and abuts against the outer face of the inner raceway of the bearing 49. A milling cutter 57 is removably secured as by means of bolts 58 to the outer face of the disk 55. The spindle 47 is formed in a plurality of sections decreasing progressively in diameter from one end to the other, and the parts are so proportioned that they may be readily disassembled, and when assembled are clamped in operative position by the bolt 56.

It will be evident that the attachment may be mounted in position easily and quickly, and that perpendicular surfaces can be milled at one setting of the work with accuracy and economy of time.

I claim as my invention:—

1. A milling attachment for a headstock with a spindle rotatable therein, said attachment comprising, in combination an elongated casing adapted to be removably secured to said headstock, a longitudinal spindle rotatably mounted in said casing, an end cutter adapted to be secured to said longitudinal spindle, a transverse spindle rotatably mounted in said casing, a side cutter adapted to be secured to said transverse spindle, gear means for operatively connecting said longitudinal spindle to said headstock spindle, and gear means operatively connecting said longitudinal spindle to said transverse spindle.

2. A milling attachment for a headstock having a spindle rotatable therein, said spindle having a socket in its outer end, said attachment comprising, in combination an elongated casing adapted to be removably secured to said headstock, an arbor adapted to be removably secured in said socket and having a gear on its free end, a longitudinal spindle rotatably mounted in said casing and having a socket in its outer end, gear means connecting said longitudinal spindle to said gear, a milling cutter mounted in said last mentioned socket, a transverse spindle rotatably mounted in said casing, a milling cutter mounted on one end of said transverse spindle, and reduction gearing connecting said longitudinal spindle to said transverse spindle.

3. A milling attachment for a headstock having a spindle rotatable therein, said spindle having a tapered socket in one end, said attachment having, in combination, an arbor removably secured in said socket, a gear on the outer end of said arbor, an elongated conical casing removably secured to said headstock over the free end of said spindle, a longitudinal spindle rotatably mounted in the lower part of said casing and having a conical socket in its forward end, a gear keyed to the rear end of said longitudinal spindle and in mesh with said first mentioned gear, a milling cutter in said last mentioned socket, means for securing said cutter in said last mentioned socket, a worm formed on the periphery of said longitudinal spindle intermediate its ends, a transverse spindle rotatably journaled in said casing above said longitudinal spindle, a worm wheel keyed to said transverse spindle and meshing with said worm, and a milling cutter secured to one end of said transverse spindle.

4. A milling attachment for a headstock having a spindle rotatable therein, said spindle having a tapered socket in one end, said attachment having, in combination, an arbor adapted to be removably secured in said socket, a gear on the outer end of said arbor, an elongated conical casing adapted to be removably secured to said headstock over the free end of said spindle, a longitudinal spindle rotatably mounted in said casing and having cutter supporting means at its forward end, a gear keyed to the rear end of said longitudinal spindle in mesh with said first mentioned gear, a worm formed on the periphery of said longitudinal spindle intermediate its ends, a transverse spindle rotatably journaled in said casing across said longitudinal spindle, a worm wheel keyed to said transverse spindle and meshing with said worm, and cutter supporting means on one end of said transverse spindle.

5. A milling attachment for a headstock having a tool spindle, said attachment comprising, in combination an elongated casing adapted to be mounted at one end for full rotary adjustment on said headstock, a longitudinal spindle rotatable in said casing, drive means adapted to connect said last mentioned spindle to said headstock spindle, a milling cutter on one end of said longitudinal spindle, a transverse spindle rotatable in said casing and adapted to be driven from said longitudinal spindle, and two milling cutters one secured to each end of said transverse spindle outside of said casing.

6. A milling attachment for a head stock having a spindle rotatable therein, said attachment having in combination a gear removably secured to one end of said spindle outside of said headstock, an elongated casing removably secured at one end to said headstock over the free end of said spindle, a longitudinal spindle rotatably mounted in said casing, the forward end of said longitudinal spindle being accessible from outside said casing, a gear secured to said longitudinal spindle and in mesh with said first mentioned gear, means for securing a tool to the forward end of said longitudinal spindle, a worm fixed on said longitudinal spindle, a transverse spindle rotatably mounted in said casing, a worm wheel secured on said transverse spindle and meshing with said worm, and means for securing a tool to one end of said transverse spindle outside of said casing.

7. A milling attachment for a headstock having a spindle, said attachment comprising, in combination, an elongated casing having a circular base on one end adapted to be mounted for rotary adjustment on said headstock concentrically about said spindle, the free end of said casing being flattened, a longitudinal spindle rotatable in said casing with one end accessible at the free end of said casing for the attachment of a milling cutter, gear means for connecting said longitudinal spindle to said headstock spindle, a transverse spindle journaled in said casing and crossing said longitudinal spindle, the ends of said transverse spindle being accessible at opposite sides of said casing for the attachment to each end of a milling cutter, and gear means for connecting said transverse spindle to said longitudinal spindle.

8. A milling attachment for a headstock having a spindle, said attachment comprising, in combination, a casing adapted to be removably secured to said headstock and having parallel flattened side walls, a spindle parallel to said first mentioned spindle and journaled in said casing longitudinally of and between said walls, a worm on said longitudinal spindle, means for operatively connecting said spindles, a transverse spindle journaled in said walls, a worm wheel on said transverse spindle between said walls and in engagement with said worm, and two milling cutters one secured to each end of said transverse spindle.

9. A milling attachment for a headstock having a spindle, said attachment comprising, in combination, a casing adapted to be removably secured to said headstock, said casing being formed with opposed side walls, two alined antifriction bearings mounted respectively in said walls, one bearing being larger in diameter than the other, a tool spindle journaled in said bearings, one end of said tool spindle being larger in diameter than the other, the enlarged end of said tool spindle being formed with a flange disposed against the outside of the adjacent side wall, a flange removably secured to the reduced end of said tool spindle and disposed adjacent the outside of the other side wall, two milling cutters secured respectively to said flanges, a gear member secured to said tool spindle between said bearings, and means for driving said gear member from said first mentioned spindle.

10. A milling attachment for a headstock having a tool spindle, said attachment comprising, in combination, an elongated casing having a circular base at one end adapted to be removably secured to said headstock for rotary adjustment concentrically about said spindle with the free end of said spindle extending into and terminating in said casing, a pair of cross tool spindles rotatably mounted in said casing, drive means connecting said cross spindles, one of said cross spindles extending longitudinally of said casing and in parallel spaced relation to said headstock spindle, separable drive means adapted to connect one of said cross spindles to said headstock spindle when said casing is secured to said headstock, and two milling cutters one on each cross spindle.

11. A milling attachment for a headstock having a horizontal tool spindle, said attachment comprising, in combination, a casing having a circular base adapted to be removably secured to said headstock for rotary adjustment concentrically about said spindle, one end of said spindle being accessible from the interior of said casing, a gear removably secured coaxially on said one end of said spindle, a tubular horizontal spindle journaled in said casing in parallel offset spaced relation to said first mentioned spindle, a gear on said tubular spindle and meshing with said first mentioned gear, said last mentioned gear being adapted to roll about said first mentioned gear upon rotary adjustment of said casing on said headstock, one end of said tubular spindle having a socket opening to the exterior of said casing, a milling cutter having a shank fitted in said socket, a draw bolt rotatably anchored at one end against endwise movement and extending axially through said tubular spindle into threaded engagement with the inner end of said shank, said casing being formed with an opening to afford access to said bolt.

12. A milling attachment for a headstock having a horizontal tool spindle, said attachment comprising, in combination, a casing having a circular base adapted to be removably secured to said headstock for rotary adjustment concentrically about said spindle, one end of said spindle being accessible from the interior of said casing, a gear removably secured coaxially on said one end of said spindle, a horizontal shaft journaled in said casing in parallel offset spaced relation to said spindle, a gear on said shaft and meshing with said first mentioned gear, said last mentioned gear being adapted to roll about said first mentioned gear upon rotary adjustment of said casing on said headstock, a tool spindle journaled in said casing and projecting therefrom, a milling cutter on said last mentioned spindle, and drive means between said shaft and said last mentioned spindle.

13. A milling attachment for a headstock having a horizontal tool spindle, said attachment comprising, in combination, a casing having a circular base adapted to be removably secured to said headstock for rotary adjustment concentrically about said spindle, one end of said spindle being accessible from the interior of said casing, a gear removably secured coaxially on said one end of said spindle, a horizontal spindle journaled in said casing in parallel offset spaced relation to said first mentioned spindle, a gear on said last mentioned spindle and meshing with said first mentioned gear, said last mentioned gear being adapted to roll about said first mentioned gear upon rotary adjustment of said casing on said headstock, one end of said last mentioned spindle being accessible from the exterior of said casing, and a milling cutter secured to said one end of said last mentioned spindle.

RAYMOND M. WOYTYCH.